(12) United States Patent
Perevozchikov et al.

(10) Patent No.: US 11,306,726 B2
(45) Date of Patent: Apr. 19, 2022

(54) FOIL BEARING ASSEMBLY AND COMPRESSOR INCLUDING SAME

(71) Applicant: Emerson Climate Technologies, Inc., Sidney, OH (US)

(72) Inventors: Michael M. Perevozchikov, Tipp City, OH (US); Chris N. Siefring, Fort Recovery, OH (US); Craig F. Robillard, Troy, OH (US); Zheji Liu, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 92 days.

(21) Appl. No.: 16/809,836

(22) Filed: Mar. 5, 2020

(65) Prior Publication Data

US 2020/0291953 A1 Sep. 17, 2020

Related U.S. Application Data

(60) Provisional application No. 62/816,659, filed on Mar. 11, 2019.

(51) Int. Cl.
*F04D 29/046* (2006.01)
*F04D 29/053* (2006.01)
(Continued)

(52) U.S. Cl.
CPC ......... *F04D 29/046* (2013.01); *F04D 29/053* (2013.01); *F04D 29/056* (2013.01);
(Continued)

(58) Field of Classification Search
CPC .... F16C 17/024; F16C 25/02; F16C 33/1045; F16C 33/06; F16C 43/02; F16C 2362/52;
(Continued)

(56) References Cited

U.S. PATENT DOCUMENTS 4,549,821 A 10/1985 Kawakami
5,427,455 A 6/1995 Bosley
(Continued)

FOREIGN PATENT DOCUMENTS

EP 1840393 A2 10/2007
EP 3109494 A1 12/2016
(Continued)

OTHER PUBLICATIONS

International Search Report and Written Opinion of the International Searching Authority regarding Application No. PCT/US2020/021791 dated Jun. 30, 2020; pp. 1-13.

*Primary Examiner* — Marcus Charles
(74) *Attorney, Agent, or Firm* — Armstrong Teasdale LLP

(57) ABSTRACT

A bearing system includes a bearing housing that includes a sleeve and a mounting structure for connecting the bearing system to a compressor housing. The sleeve has a radial inner surface that defines a cylindrical bore, and includes a locking feature located along the radial inner surface. The mounting structure is located radially outward from the sleeve. The bearing system also includes a foil bearing assembly positioned within the cylindrical bore. The foil bearing assembly includes an outer foil, an inner foil, and a bump foil positioned between the outer foil and the inner foil. At least one of the outer foil and the inner foil includes a bearing retention feature cooperatively engaged with the locking feature to maintain the foil bearing assembly within the bearing housing at a fixed rotational position.

20 Claims, 15 Drawing Sheets

(51) Int. Cl.
  *F04D 29/60* (2006.01)
  *F16C 17/02* (2006.01)
  *F16C 33/06* (2006.01)
  *F16C 33/10* (2006.01)
  *F16C 25/02* (2006.01)
  *F04D 29/056* (2006.01)
  *F16C 43/02* (2006.01)

(52) U.S. Cl.
  CPC ............ *F04D 29/60* (2013.01); *F16C 17/024* (2013.01); *F16C 25/02* (2013.01); *F16C 33/06* (2013.01); *F16C 33/1045* (2013.01); *F16C 43/02* (2013.01); *F16C 2226/36* (2013.01); *F16C 2360/44* (2013.01)

(58) Field of Classification Search
  CPC .... F04D 29/046; F04D 29/053; F04D 29/056; F04D 29/057; F04D 29/60; F04D 29/5806; F25B 1/04; F25B 31/006; F25B 31/026; F25B 2400/07
  USPC ........ 384/103, 106, 215, 906; 415/107, 180, 415/229
  See application file for complete search history.

(56) References Cited

U.S. PATENT DOCUMENTS

| | | | |
|---|---|---|---|
| 5,827,040 A * | 10/1998 | Bosley | F16C 37/002 |
| | | | 415/106 |
| 5,857,348 A | 1/1999 | Conry | |
| 5,988,885 A | 1/1999 | Heshmat | |
| 5,902,049 A | 5/1999 | Heshmat | |
| 5,915,841 A | 6/1999 | Weissert | |
| 6,158,893 A * | 12/2000 | Heshmat | F16C 17/024 |
| | | | 384/106 |
| 6,190,048 B1 * | 2/2001 | Weissert | F01D 25/166 |
| | | | 384/103 |
| 6,632,077 B2 | 10/2003 | Sishtla | |
| 6,786,642 B2 | 9/2004 | Dubreil et al. | |
| 6,811,315 B2 | 11/2004 | Fournier et al. | |
| 6,948,853 B2 | 9/2005 | Agrawal | |
| 6,997,686 B2 | 2/2006 | Agrawal et al. | |
| 7,070,330 B2 | 7/2006 | Agrawal | |
| 7,553,086 B2 * | 6/2009 | Kang | F16C 17/024 |
| | | | 384/103 |
| 7,615,291 B2 * | 11/2009 | Lee | C09D 7/61 |
| | | | 428/701 |
| 7,658,545 B2 | 2/2010 | Dubreuil et al. | |
| 8,371,799 B2 | 2/2013 | Spathias et al. | |
| 8,419,283 B2 | 4/2013 | McAuliffe et al. | |
| 8,496,432 B2 | 7/2013 | Beers et al. | |
| 8,500,331 B2 | 8/2013 | Kim et al. | |
| 8,529,192 B2 | 9/2013 | Beers et al. | |
| 8,556,516 B2 | 10/2013 | Beers et al. | |
| 8,801,290 B2 | 8/2014 | Heshmat | |
| 8,807,921 B2 | 8/2014 | Struziak | |
| 8,967,866 B2 | 3/2015 | Struziak et al. | |
| 8,979,483 B2 | 3/2015 | Suciu et al. | |
| 9,109,622 B2 * | 8/2015 | Meacham | F16C 17/024 |
| 9,115,598 B2 | 8/2015 | Van Duyn et al. | |
| 9,121,303 B2 | 9/2015 | Dobek et al. | |
| 9,394,941 B2 * | 7/2016 | Ryu | F16C 32/0685 |
| 9,719,556 B2 * | 8/2017 | Kim | F16C 43/02 |
| 9,850,814 B2 | 12/2017 | Grogg | |
| 9,932,986 B2 | 4/2018 | Dibenedetto | |
| 9,976,595 B2 | 5/2018 | Kim | |
| 9,989,083 B2 | 6/2018 | Labbe | |
| 10,072,702 B2 * | 9/2018 | Dahinten | F16C 17/024 |
| 10,465,743 B2 * | 11/2019 | Braun | F16C 17/024 |
| 2005/0163407 A1 | 7/2005 | Kang et al. | |
| 2007/0047858 A1 | 3/2007 | Hurley et al. | |
| 2008/0057223 A1 * | 3/2008 | Lee | F16C 17/024 |
| | | | 427/576 |
| 2008/0310779 A1 | 12/2008 | Agrawal | |
| 2013/0195646 A1 | 8/2013 | Merry et al. | |
| 2015/0247458 A1 | 9/2015 | Scott et al. | |
| 2015/0275761 A1 | 10/2015 | Duffy et al. | |
| 2015/0362012 A1 | 12/2015 | Ermilov | |
| 2016/0040915 A1 | 2/2016 | Jonsson et al. | |
| 2016/0208847 A1 | 7/2016 | McAuliffe et al. | |
| 2016/0369838 A1 | 12/2016 | Rocchi et al. | |
| 2016/0377114 A1 * | 12/2016 | Dahinten | F16C 43/02 |
| | | | 384/106 |
| 2017/0089387 A1 | 3/2017 | Kim et al. | |
| 2017/0211417 A1 | 7/2017 | Duffy et al. | |
| 2017/0261031 A1 | 9/2017 | Gonzalez et al. | |
| 2018/0051745 A1 | 2/2018 | Himmelmann | |
| 2018/0149204 A1 | 5/2018 | Baudelocque | |
| 2018/0298941 A1 | 10/2018 | McAuliffe et al. | |
| 2018/0371929 A1 | 12/2018 | Amador et al. | |
| 2019/0072134 A1 | 3/2019 | Rajendran | |
| 2019/0170186 A1 | 6/2019 | Gonzalez et al. | |
| 2019/0195089 A1 | 6/2019 | Kovacik et al. | |

FOREIGN PATENT DOCUMENTS

| | | | | |
|---|---|---|---|---|
| JP | 2011202566 A | * | 10/2011 | ........... F04D 29/057 |
| JP | 2011214523 A | * | 10/2011 | ........... F04D 29/057 |
| KR | 20180018178 A | * | 2/2018 | ........... F16C 17/024 |
| WO | 2015141506 A1 | | 9/2015 | |

* cited by examiner

FOIL BEARING ASSEMBLY AND COMPRESSOR INCLUDING SAME

CROSS-REFERENCE TO RELATED APPLICATIONS

This application claims priority to U.S. Provisional Patent Application Ser. No. 62/816,659, filed on Mar. 11, 2019, the disclosure of which is hereby incorporated by reference in its entirety.

FIELD

The field of the disclosure relates generally to bearing systems, and more particularly, to gas foil bearing assemblies for use in compressors.

BACKGROUND

Recent CFC-free commercial refrigerant compositions, such as R134A, are characterized as having lower density compared to previously-used CFC or HCFC refrigerants such as R12. Consequently, an air conditioning system must process a higher volume of a CFC-free refrigerant composition relative to CFC or HCFC refrigerant to provide a comparable amount of cooling. To process higher volumes of refrigerant, the design of a gas compressor may be modified to process refrigerant at higher operating speeds and/or operate with higher efficiency.

Centrifugal compressors that make use of continuous dynamic compression offer at least several advantages over other compressor designs, such as reciprocating, rotary, scroll, and screw compressors that make use of positive displacement compression. Centrifugal compressors have numerous advantages over at least some positive displacement compressor designs, including lower vibration, higher efficiency, more compact structure and associated lower weight, and higher reliability and lower maintenance costs due to a smaller number of components vulnerable to wear. However, centrifugal compressors typically require relatively tight tolerances and high manufacturing accuracy. Although most often used in high-capacity cooling systems, the incorporation of centrifugal compressors in lower-capacity systems is limited due to the high rotation speed of the impeller of a centrifugal compressor and the associated challenges of providing a suitable operating environment for the impeller and associated motor.

Centrifugal compressors typically include compressor bearings to support a driveshaft used to transfer power from the motor to the impeller that imparts kinetic energy to incoming refrigerant. The compressor bearings are typically provided with one or more features to reduce friction between the compressor bearing and the driveshaft. The design of these friction-reducing features of the bearings pose an on-going challenge due at least in part to the CFC-free refrigerant compositions and the challenging operating environment within gas compressors such as air conditioning compressors.

Some compressor bearings in existing refrigerant compressors use oil or alternative compositions as a lubricant, but CFC-free refrigerants are incompatible with at least some existing lubricant compositions. Other compressor bearings are oil-free magnetic bearings that levitate the driveshaft within a magnetic field provided by high-strength magnets, but magnetic bearings are typically complex in design, add significant weight, and limit the choice of driveshaft materials to ferromagnetic materials in order to respond to the magnetic fields within the magnetic bearings. Another type of oil-free bearings is a foil bearing that includes compliant foil elements that surround the driveshaft and support the driveshaft on a fluid layer formed between the driveshaft and the foil elements when the rotation speed of the driveshaft exceeds a threshold speed termed liftoff speed. Foil bearings are well-suited for the high-speed operating environment typical of centrifugal compressors, are compatible with all refrigerant compositions, and may be used with a wider variety of driveshaft materials, thereby permitting the use of lighter-weight materials to reduce the amount of energy needed to operate the compressor.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a bearing system includes a bearing housing that includes a sleeve and a mounting structure for connecting the bearing system to a compressor housing. The sleeve has a radial inner surface that defines a cylindrical bore, and includes a locking feature located along the radial inner surface. The mounting structure is located radially outward from the sleeve. The bearing system also includes a foil bearing assembly positioned within the cylindrical bore. The foil bearing assembly includes an outer foil, an inner foil, and a bump foil positioned between the outer foil and the inner foil. At least one of the outer foil and the inner foil includes a bearing retention feature cooperatively engaged with the locking feature to maintain the foil bearing assembly within the bearing housing at a fixed rotational position.

In another aspect, a compressor includes a compressor housing, a driveshaft rotatably supported within the compressor housing, an impeller connected to the driveshaft and operable to impart kinetic energy to incoming refrigerant gas upon rotation of the driveshaft, a bearing housing mounted to the compressor housing, and a foil bearing assembly rotatably supporting the driveshaft. The bearing housing includes a sleeve having a radial inner surface that defines a cylindrical bore. The sleeve includes a locking feature located along the radial inner surface. The foil bearing assembly is positioned within the cylindrical bore, and includes an outer foil, an inner foil, and a bump foil positioned between the outer foil and the inner foil. At least one of the outer foil and the inner foil includes a bearing retention feature cooperatively engaged with the locking feature to maintain the foil bearing assembly within the bearing housing at a fixed rotational position.

In yet another aspect, a method of assembling a compressor includes mounting a bearing housing to a compressor housing. The bearing housing includes a sleeve having a radial inner surface that defines a cylindrical bore. The sleeve includes a locking feature located along the radial inner surface. The method further includes inserting a foil bearing assembly within the cylindrical bore. The foil bearing assembly includes an outer foil, an inner foil, and a bump foil positioned between the outer foil and the inner foil. The method further includes connecting at least one of the outer foil and the inner foil to the bearing housing by cooperatively engaging a bearing retention feature of the at least one outer foil and inner foil with the locking feature to maintain the foil bearing assembly within the bearing housing at a fixed rotational position.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The following figures illustrate various aspects of the disclosure.

Corresponding reference characters indicate corresponding parts throughout the drawings.

DETAILED DESCRIPTION

Figure 1:
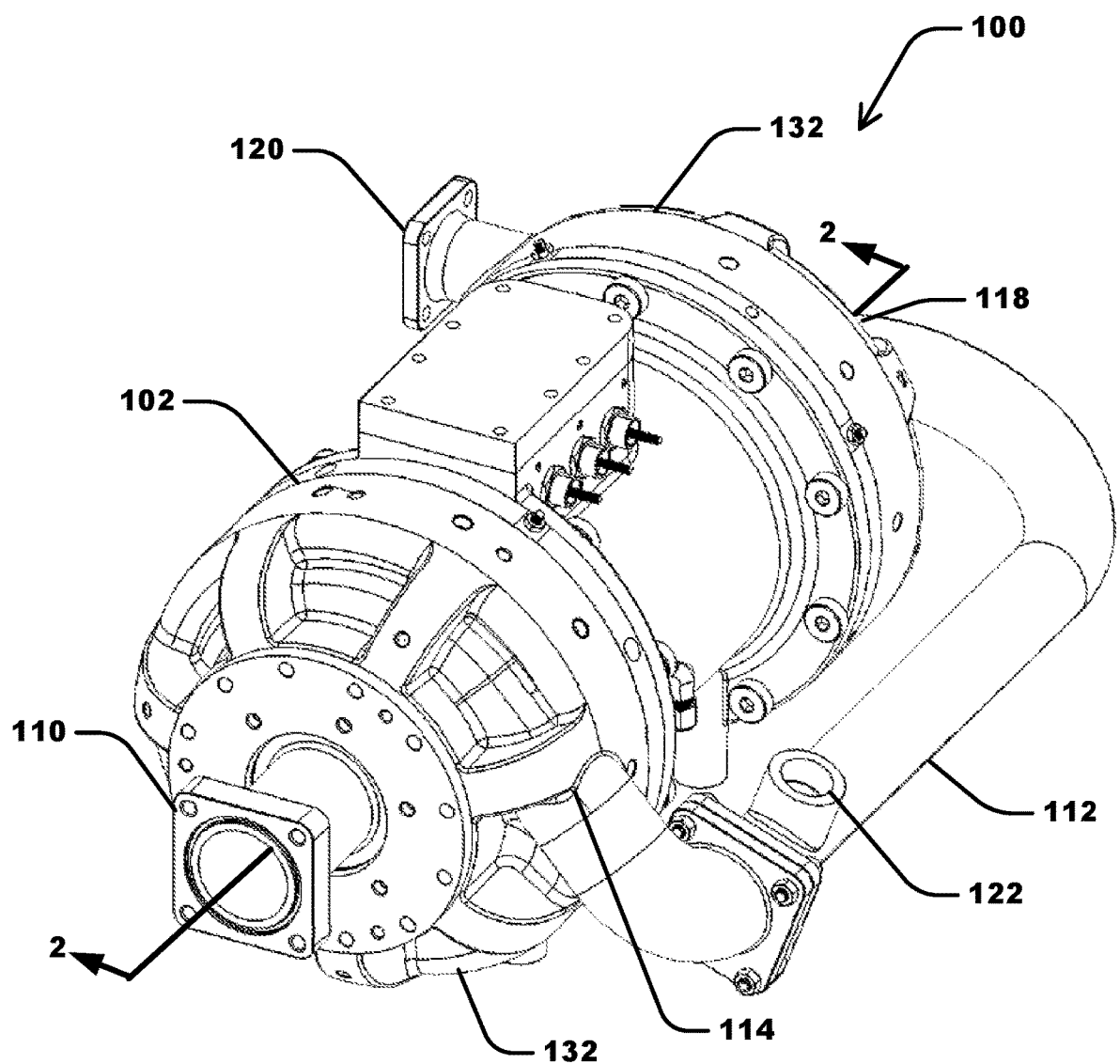
FIG. 1 is a perspective view of an assembled compressor.

Referring to FIG. 1, a compressor illustrated in the form of a two-stage refrigerant compressor is indicated generally at 100. The compressor 100 generally includes a compressor housing 102 forming at least one sealed cavity within which each stage of refrigerant compression is accomplished. The compressor 100 includes a first refrigerant inlet 110 to introduce refrigerant vapor into the first compression stage (not labeled in FIG. 1), a first refrigerant exit 114, a refrigerant transfer conduit 112 to transfer compressed refrigerant from the first compression stage to the second compression stage, a second refrigerant inlet 118 to introduce refrigerant vapor into the second compression stage (not labeled in FIG. 1), and a second refrigerant exit 120. The refrigerant transfer conduit 112 is operatively connected at opposite ends to the first refrigerant exit 114 and the second refrigerant inlet 118, respectively. The second refrigerant exit 120 delivers compressed refrigerant from the second compression stage to a cooling system in which compressor 100 is incorporated. The refrigerant transfer conduit 112 may further include a refrigerant bleed 122 to add or remove refrigerant as needed at the compressor 100.

Figure 2:
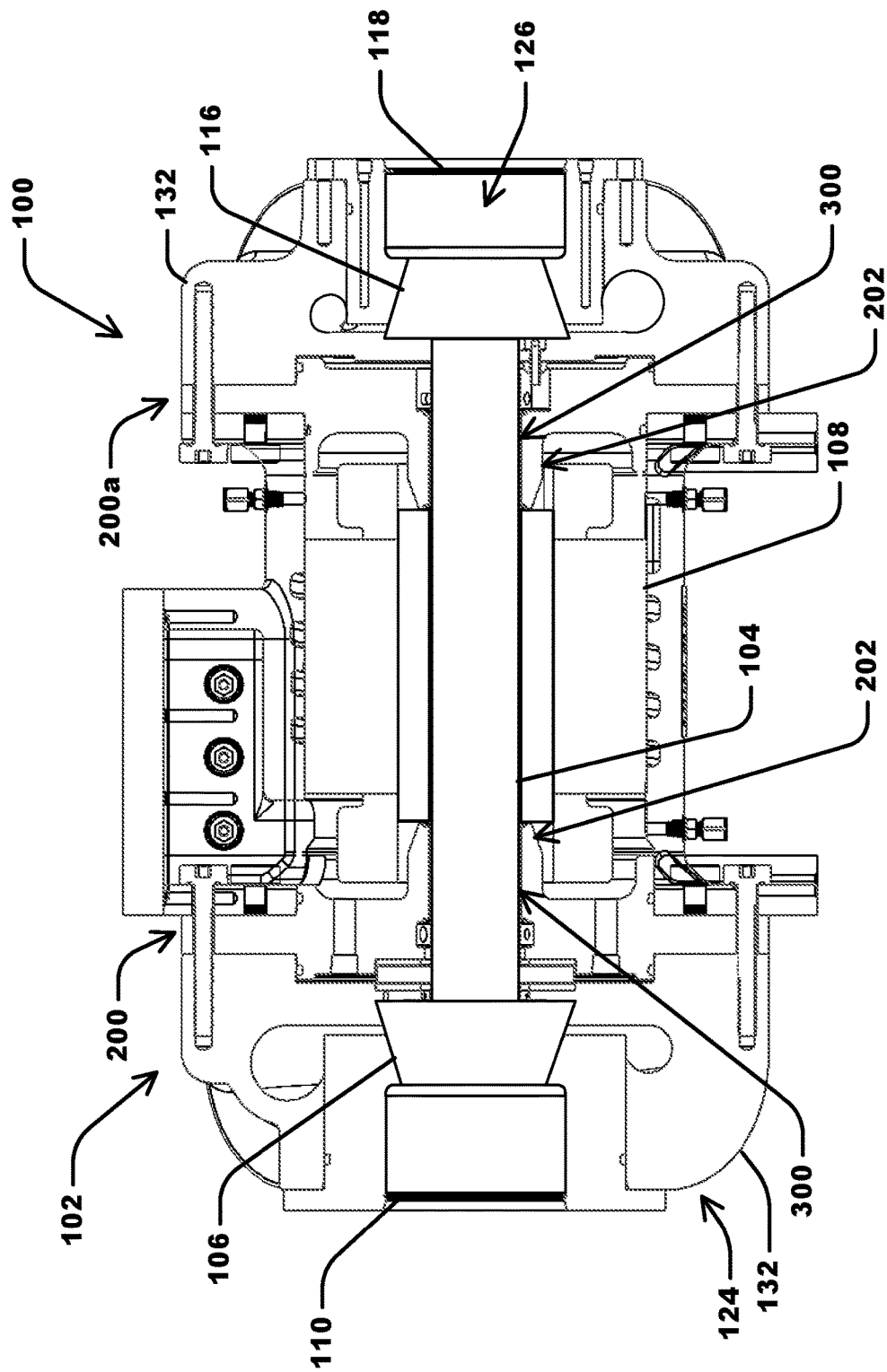
FIG. 2 is a cross-sectional view of the compressor of FIG. 1 taken along line 2-2, with the external conduit removed.

Referring to FIG. 2, the compressor housing 102 encloses a first compression stage 124 and a second compression stage 126 at opposite ends of the compressor 100. The first compression stage 124 includes a first impeller 106 configured to add kinetic energy to refrigerant entering via the first refrigerant inlet 110. The kinetic energy imparted to the refrigerant by the first impeller 106 is converted to increased refrigerant pressure (i.e. compression) as the refrigerant velocity is slowed upon transfer to a sealed cavity (e.g., a diffuser) formed between a bearing housing 200 and a portion of the outer compressor housing 102. Similarly, the second compression stage 126 includes a second impeller 116 configured to add kinetic energy to refrigerant transferred from the first compression stage 124 entering via the second refrigerant inlet 118. The kinetic energy imparted to the refrigerant by the second impeller 116 is converted to increased refrigerant pressure (i.e. compression) as the refrigerant velocity is slowed upon transfer to a sealed cavity (e.g., a diffuser) formed between a bearing housing 200 and a second portion of outer compressor housing 102. Compressed refrigerant exits the second compression stage 126 via the second refrigerant exit 120 (not shown in FIG. 2).

Figure 3:
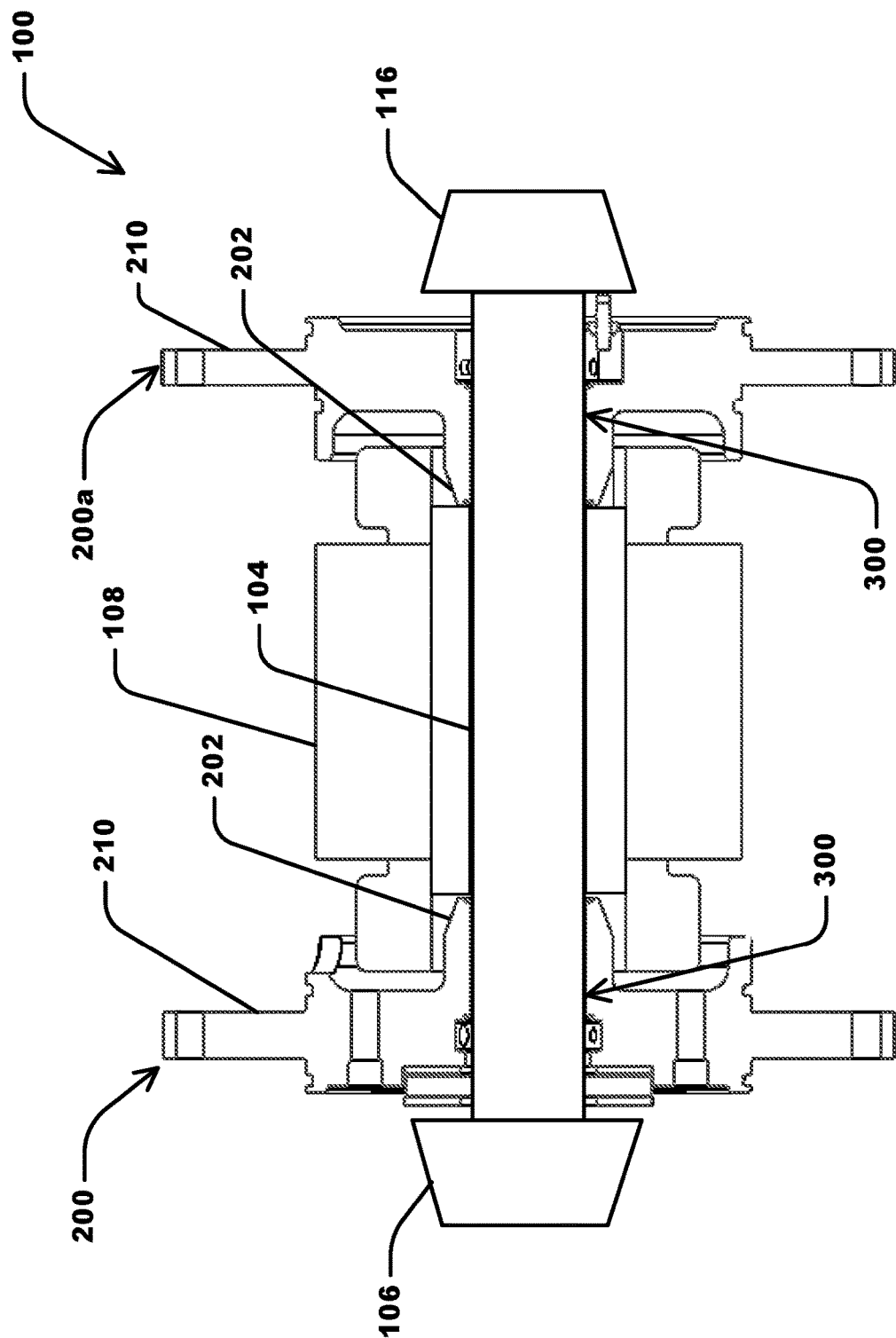
FIG. 3 is a cross-sectional view of the compressor of FIG. 2 with the external compressor housing removed.

Referring to FIG. 2 and FIG. 3, the first stage impeller 106 and second stage impeller 116 are connected at opposite ends of a driveshaft 104. The driveshaft 104 is operatively connected to a motor 108 positioned between the first stage impeller 106 and second stage impeller 116 such that the first stage impeller 106 and second stage impeller 116 are rotated at a rotation speed selected to compress the refrigerant to a pre-selected pressure exiting the second refrigerant exit 120. Any suitable motor may be incorporated into the compressor 100 including, but not limited to, an electrical motor. The driveshaft 104 is supported by gas foil bearing assemblies 300 positioned within a sleeve 202 of each bearing housing 200/200*a*, as described in additional detail below. Each bearing housing 200/200*a* includes a mounting structure 210 for connecting the respective bearing housing 200/200*a* to the compressor housing 102, as illustrated in FIG. 2.

Figure 4:
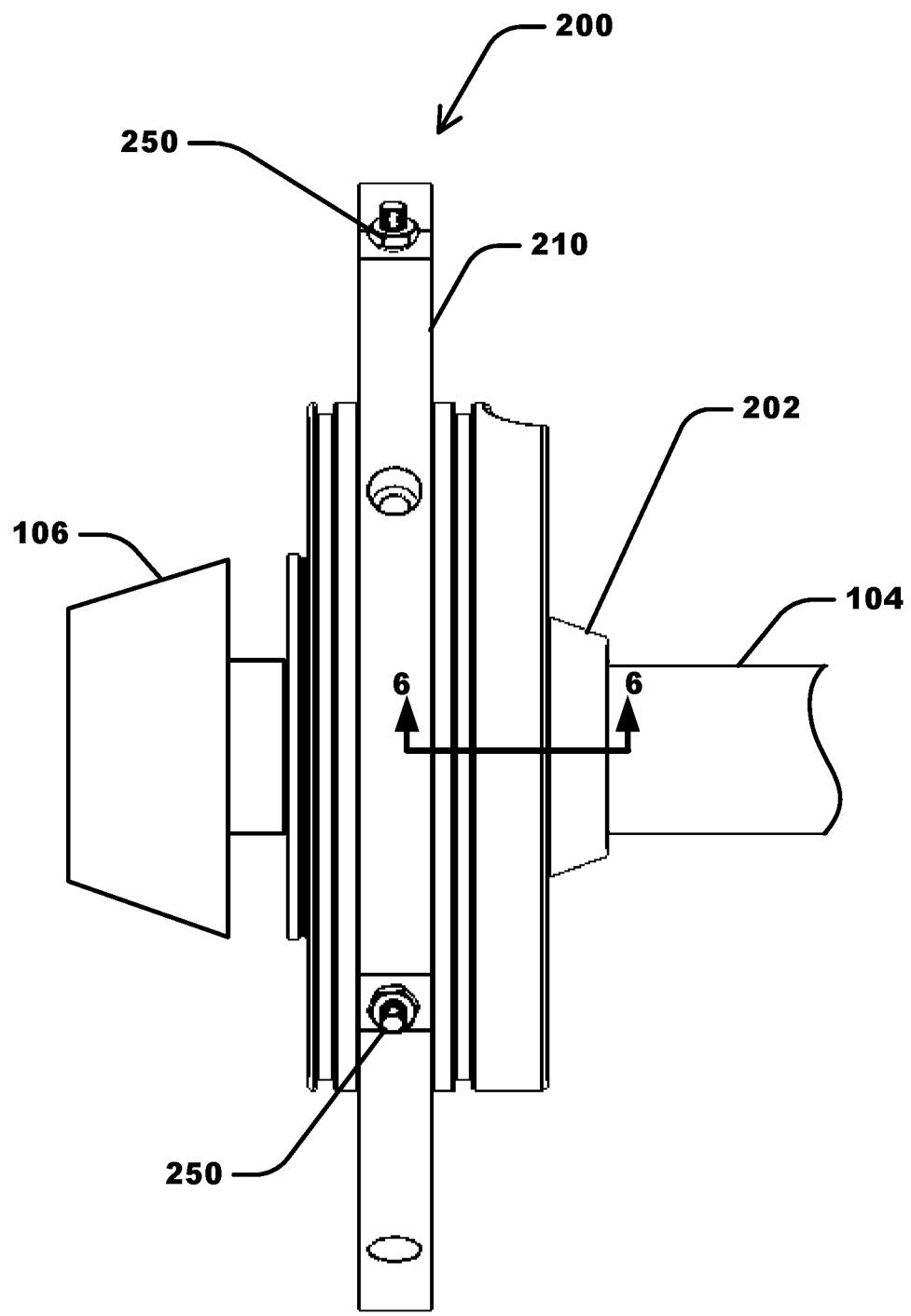
FIG. 4 is a side view of an impeller mounted to an end of a driveshaft in which the driveshaft is supported by a bearing housing.
Figure 5:
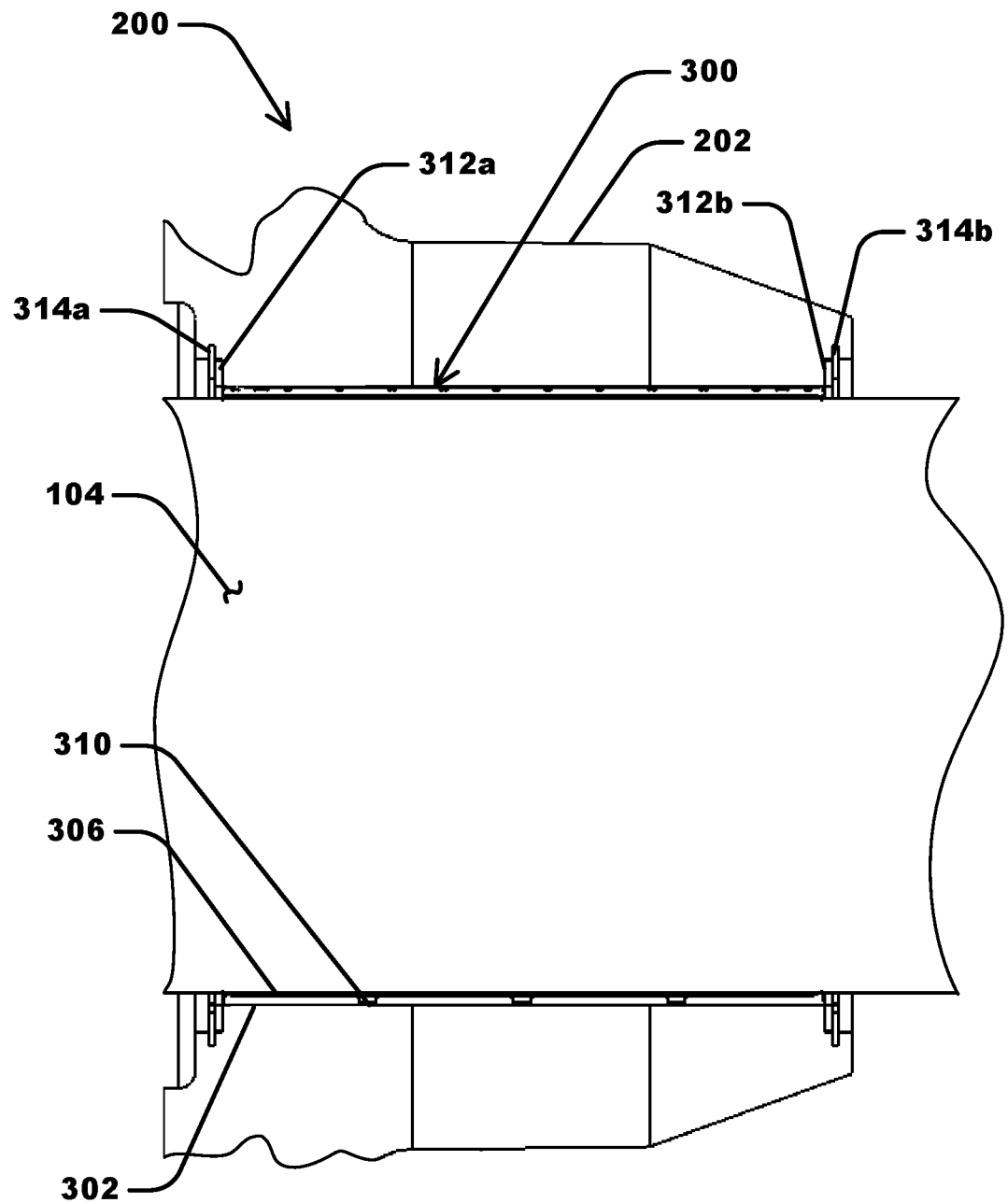
FIG. 5 is a cross-sectional view through a sleeve of the bearing housing shown in FIG. 4 taken along line 5-5, illustrating the driveshaft supported within a foil bearing assembly maintained within the sleeve of the bearing housing using a pair of retaining clips.
Figure 7:
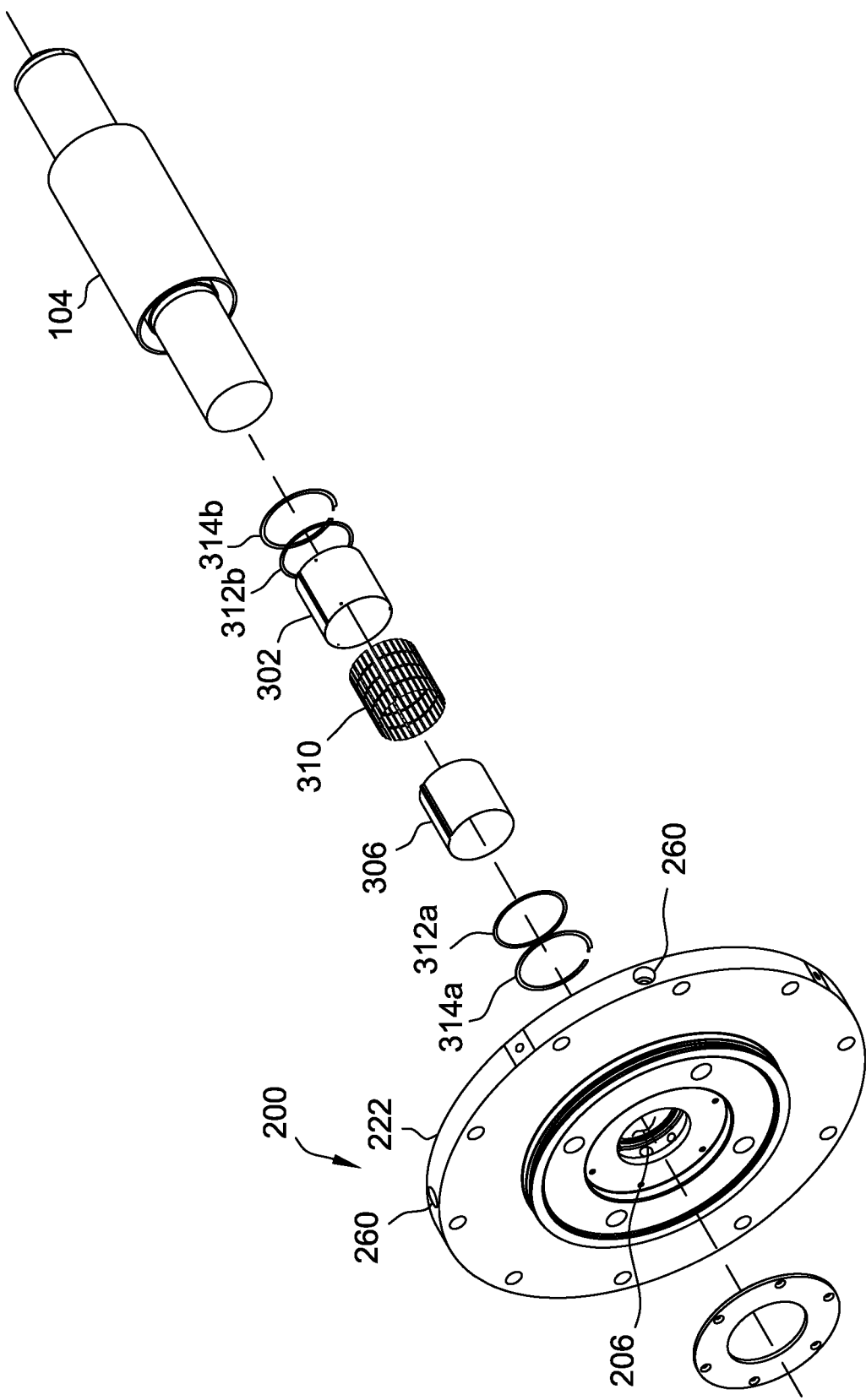
FIG. 7 is an exploded view showing the arrangement of elements of the foil bearing assembly with respect to the bearing housing and the driveshaft.

Referring to FIG. 4, each bearing housing 200/200*a* (only bearing housing 200 illustrated in FIG. 4) supports the driveshaft 104, and the driveshaft 104 projects through the bearing housing 200/200a opposite the sleeve 202, and the impeller 106 is connected to the projecting end of the driveshaft 104. Referring to FIG. 5 and FIG. 7, the gas foil bearing assembly 300 is positioned within a cylindrical bore 206 within the bearing housing 200. The driveshaft 104 closely fits within the gas foil bearing assembly 300, which includes an outer compliant foil or foil layer 302 positioned adjacent to the inner wall of the sleeve 202, an inner compliant foil or foil layer 306 (also referred to as a "top foil") positioned adjacent to the driveshaft 104, and a bump foil or foil layer 310 positioned between the inner foil layer 306 and the outer foil layer 302. The foils or layers 302/306/310 of the gas foil bearing assembly form an essentially cylindrical tube sized to receive the driveshaft 104 with relatively little or no gap design as determined by existing foil bearing design methods. The components of the foil bearing assembly 300, such as outer foil layer 302, the inner foil layer 306, and the bump foil layer 310, may be constructed of any suitable material that enables the foil bearing assembly 300 to function as described herein. Suitable materials include, for example and without limitation, metal alloys. In some embodiments, for example, each of the outer foil layer 302, the inner foil layer 306, and the bump foil layer 310 is constructed of stainless steel (e.g., 17-4 stainless steel).

Figure 8:
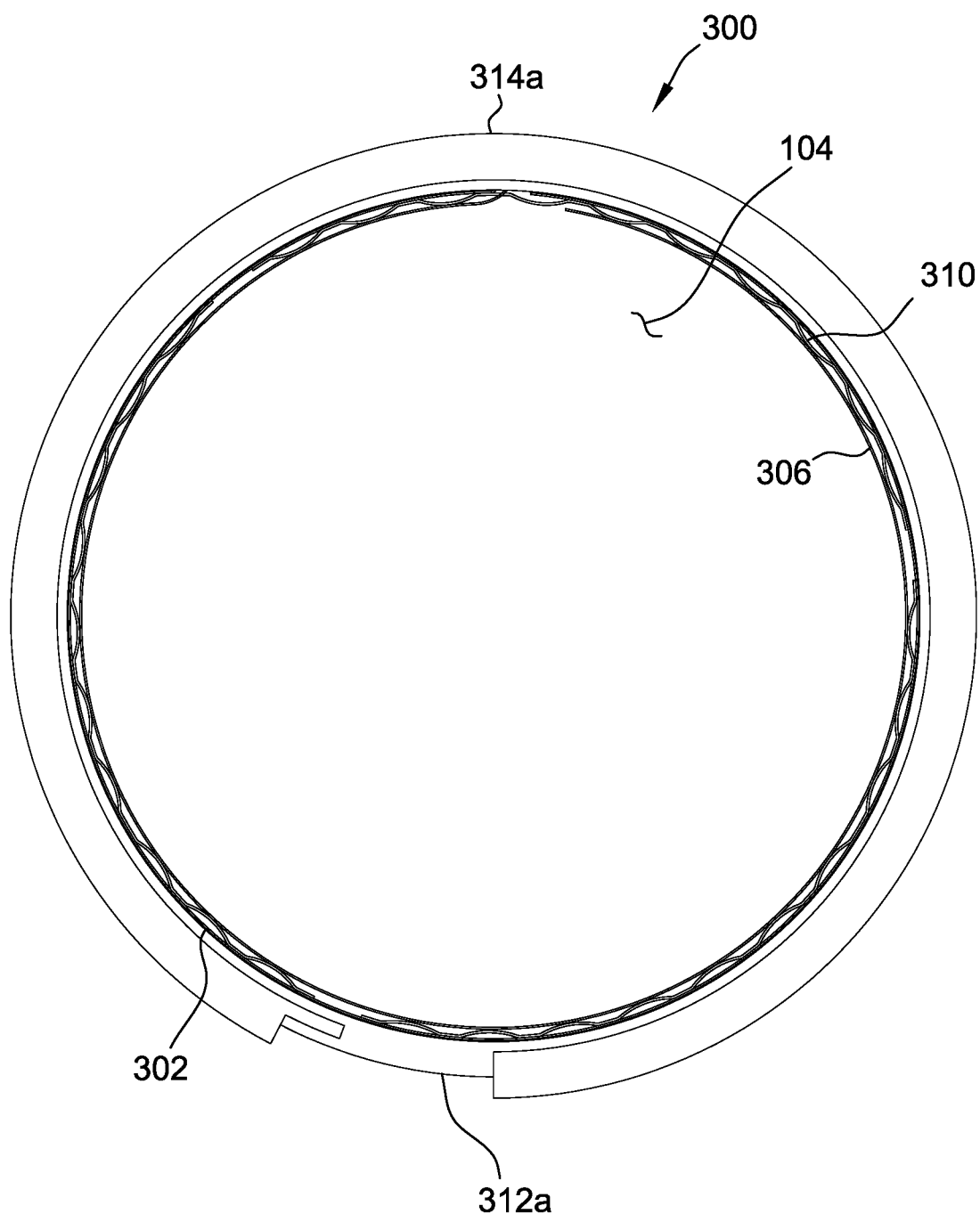
FIG. 8 is a front view of the foil bearing assembly shown in FIGS. 5 and 7.

Referring again to FIG. 5, the foil bearing assembly 300 in the illustrated embodiment further includes a pair of foil keepers 312a/312b positioned adjacent opposite ends of the layers 302/306/310 to inhibit sliding of the layers 302/306/310 in an axial direction within the cylindrical bore 206 of the sleeve 202. A pair of foil retaining clips 314a/314b positioned adjacent to the foil keepers 312a/312b, respectively, fix the layers 302/306/310 in a locked axial position within the cylindrical bore 206. Foil retaining clips 314a/314b may be removably connected to bearing housing 200. FIG. 8 further illustrates the arrangement of the foil keeper 312a and foil retaining clip 314a at one end of the foil bearing assembly 300.

Figure 6:
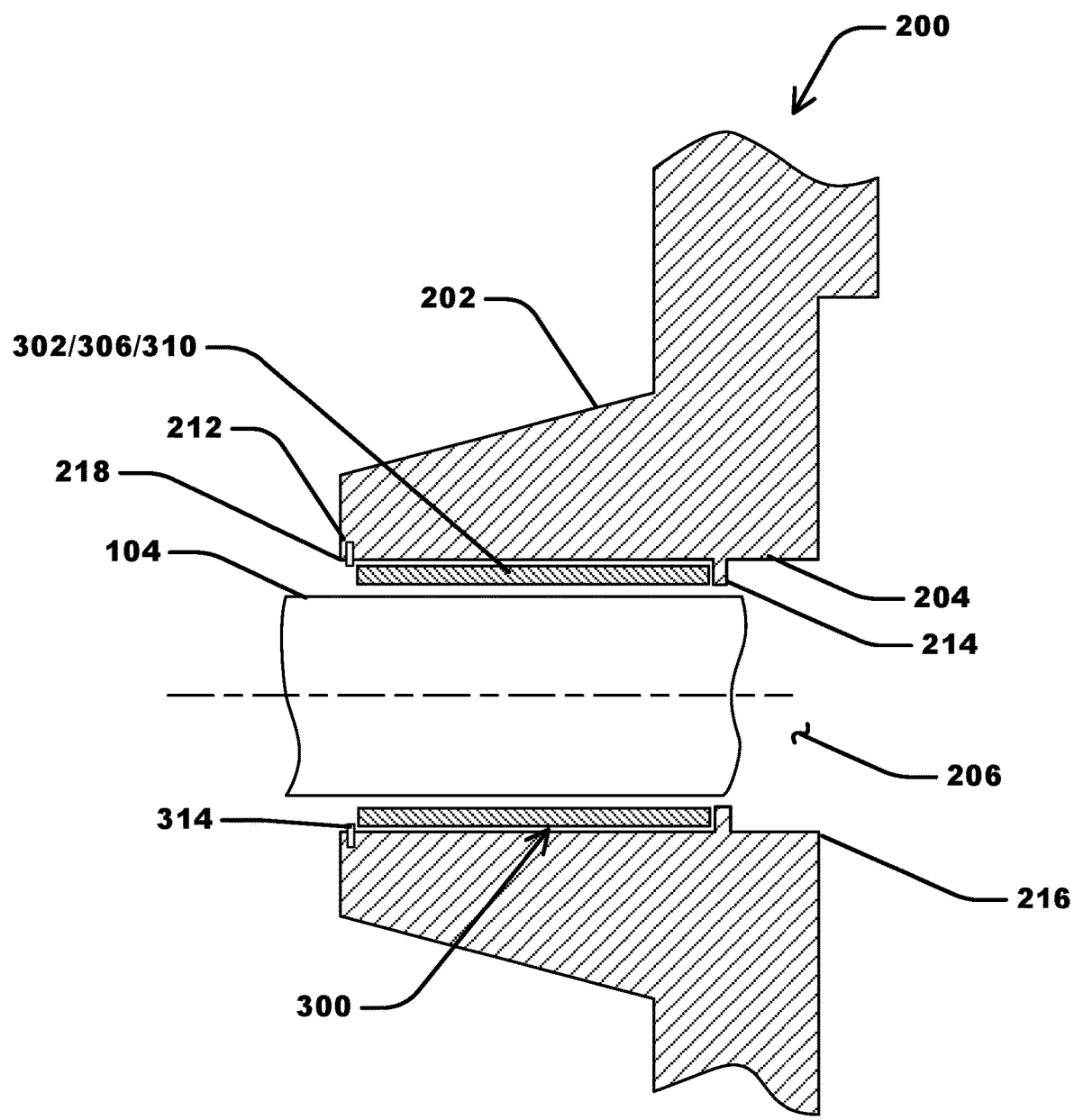
FIG. 6 is a cross-sectional view of another embodiment of a bearing housing suitable for use in the compressor of FIG. 1, illustrating the driveshaft supported within a foil bearing assembly maintained within the bearing housing between a retaining lip formed within the bearing housing at one end and a retaining clip at an opposite end.

In other embodiments, as illustrated in FIG. 6, each bearing housing 200/200a includes a foil retaining lip 214 formed integrally (e.g., cast) with the bearing housing 200 and projecting radially inward from the radial inner surface 204 that defines the cylindrical bore 206. In the illustrated embodiment, the foil retaining lip 214 is positioned near an impeller end 216 of the cylindrical bore 206 proximal to the impeller 116 (shown in FIGS. 2-3). The foil retaining lip 214 is sized and dimensioned to project a radial distance from the radial inner surface 204 that overlaps at least a portion of the layers 302/306/310 of the foil bearing assembly 300. The foil retaining lip 214 may extend fully around the circumference of the radial inner surface 204, or the foil retaining lip can include two or more segments extending over a portion of the circumference of the radial inner surface 204 and separated by spaces flush with the adjacent radial inner surface 204.

Figure 9:
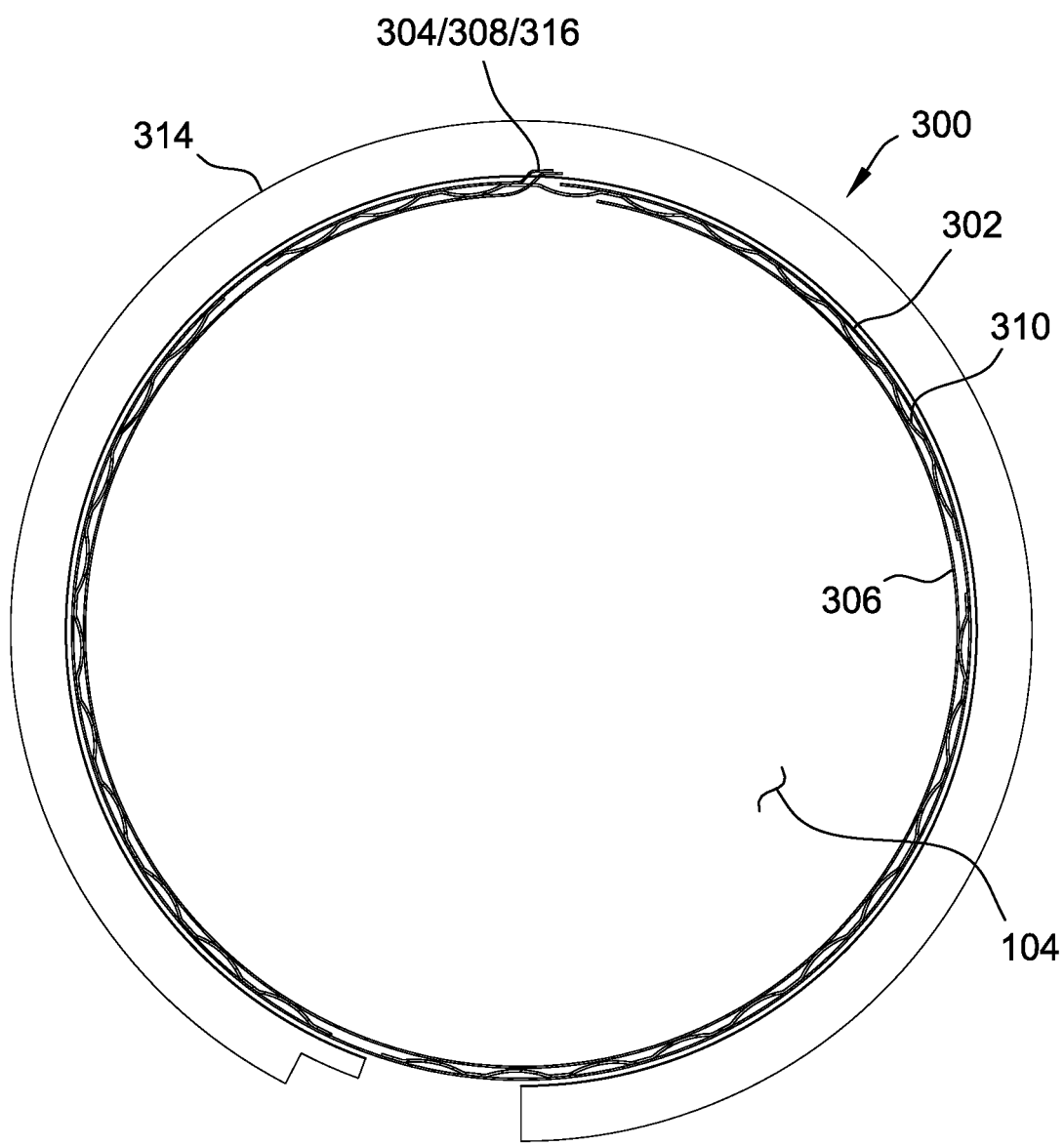
FIG. 9 is a front view of foil bearing assembly shown in FIGS. 6 and 7.
Figure 10:
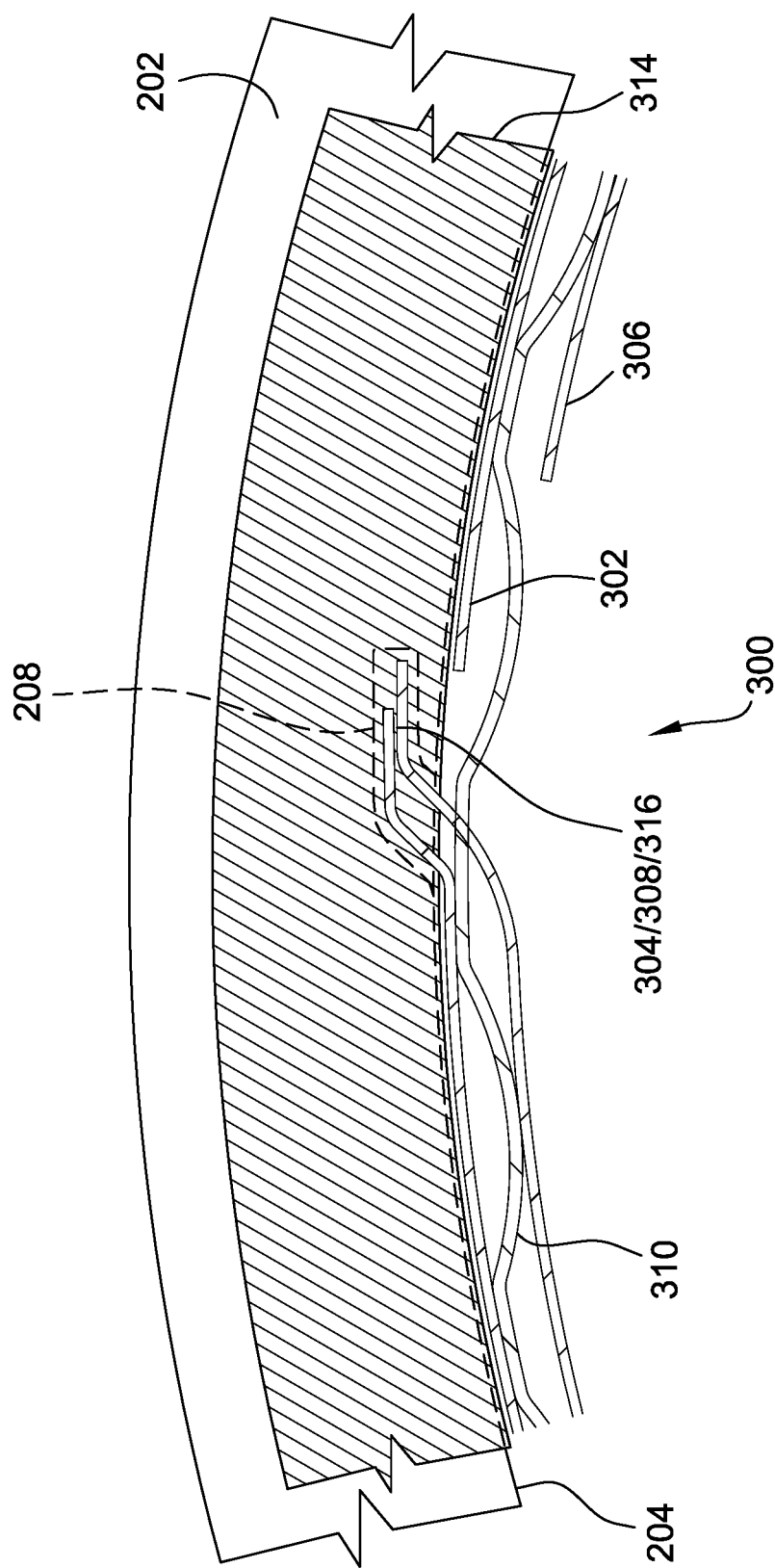
FIG. 10 is a close-up view of the foil bearing assembly shown in FIG. 9.

The foil bearing assembly 300 of the embodiment illustrated in FIG. 6 further includes a single foil retaining clip 314 positioned adjacent the ends of the layers 302/306/310 opposite the foil retaining lip 214 to inhibit axial movement of the layers 302/306/310 within the cylindrical bore 206 of the sleeve 202. In this embodiment, the foil retaining clip 314 snaps into a circumferential groove 212 formed within the radial inner surface 204 of the cylindrical bore 206 near a motor end 218 of the cylindrical bore 206. FIG. 9 and FIG. 10 further illustrate the arrangement of the foil retaining clip 314 at one end of the foil bearing assembly 300. The foil retaining clip 314 is sized and dimensioned to provide clearance for the outer layer 302, and to overlap with bearing retention features 304/308 that form a radially outward projecting tab 316, as described further below.

The foil retaining lip 214 may be positioned within any region of the cylindrical bore 206 near the impeller end 216 including, without limitation, a position immediately adjacent to the opening of the cylindrical bore 206 at the impeller end 216. Alternatively, the foil retaining lip 214 may be positioned within any region of the cylindrical bore 206 near the motor end 218 including, without limitation, a position immediately adjacent to the opening of the cylindrical bore 206 at the motor end 218. In such embodiments, the foil retaining clip 314 snaps into a circumferential groove 212 formed within the radial inner surface 204 of the cylindrical bore 206 near the impeller end 216, in an arrangement that is essentially the opposite of the arrangement illustrated in FIG. 6.

Referring again to FIG. 6, the foil bearing assembly 300 is installed within the bearing housing 200 by inserting the foil bearing assembly 300 into the cylindrical bore 206 of the bearing housing 200 at the motor end 218. The foil bearing assembly 300 is then advanced axially into the cylindrical bore 206 toward the impeller end 216 until the layers 302/306/310 contact the foil retaining lip 214. The foil retaining clip 314 is then snapped into the circumferential groove 212 near the motor end 218 of the cylindrical bore 206 to lock the foil bearing assembly 300 in place.

In other embodiments, any suitable method for affixing the foil bearing assembly 300 within the sleeve 202 may be used. Non-limiting examples of suitable methods include keepers and retaining clips, adhesives, set screws, and any other suitable affixing method.

Figure 11:
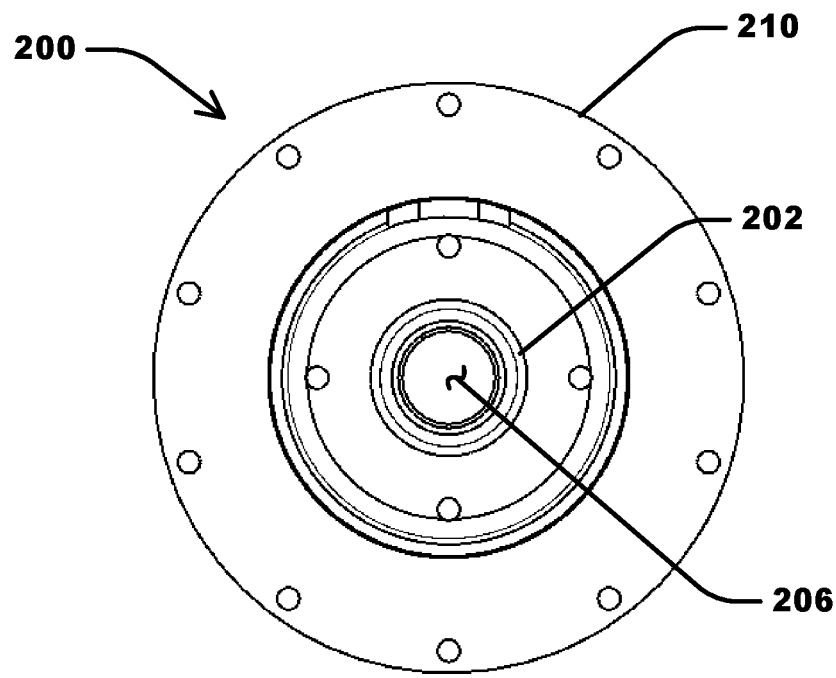
FIG. 11 is a rear view of the bearing housing shown in FIG. 7.
Figure 12:
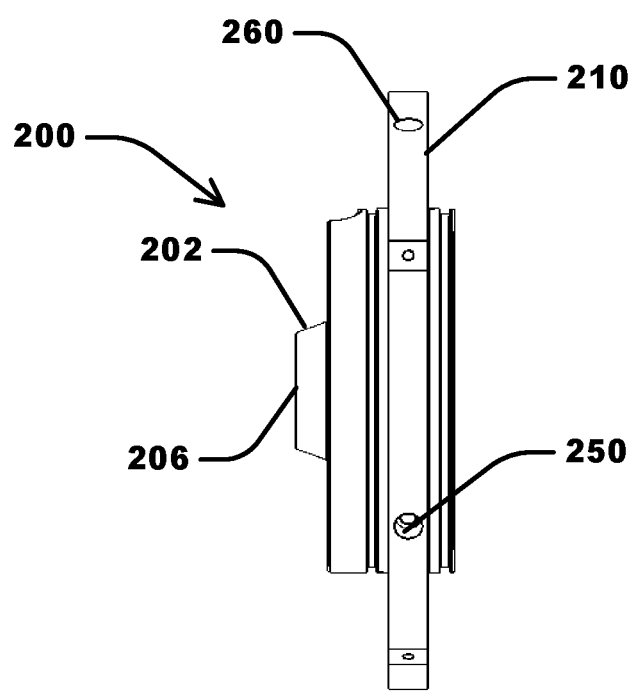
FIG. 12 is a side view of the bearing housing shown in FIG. 7.
Figure 13:
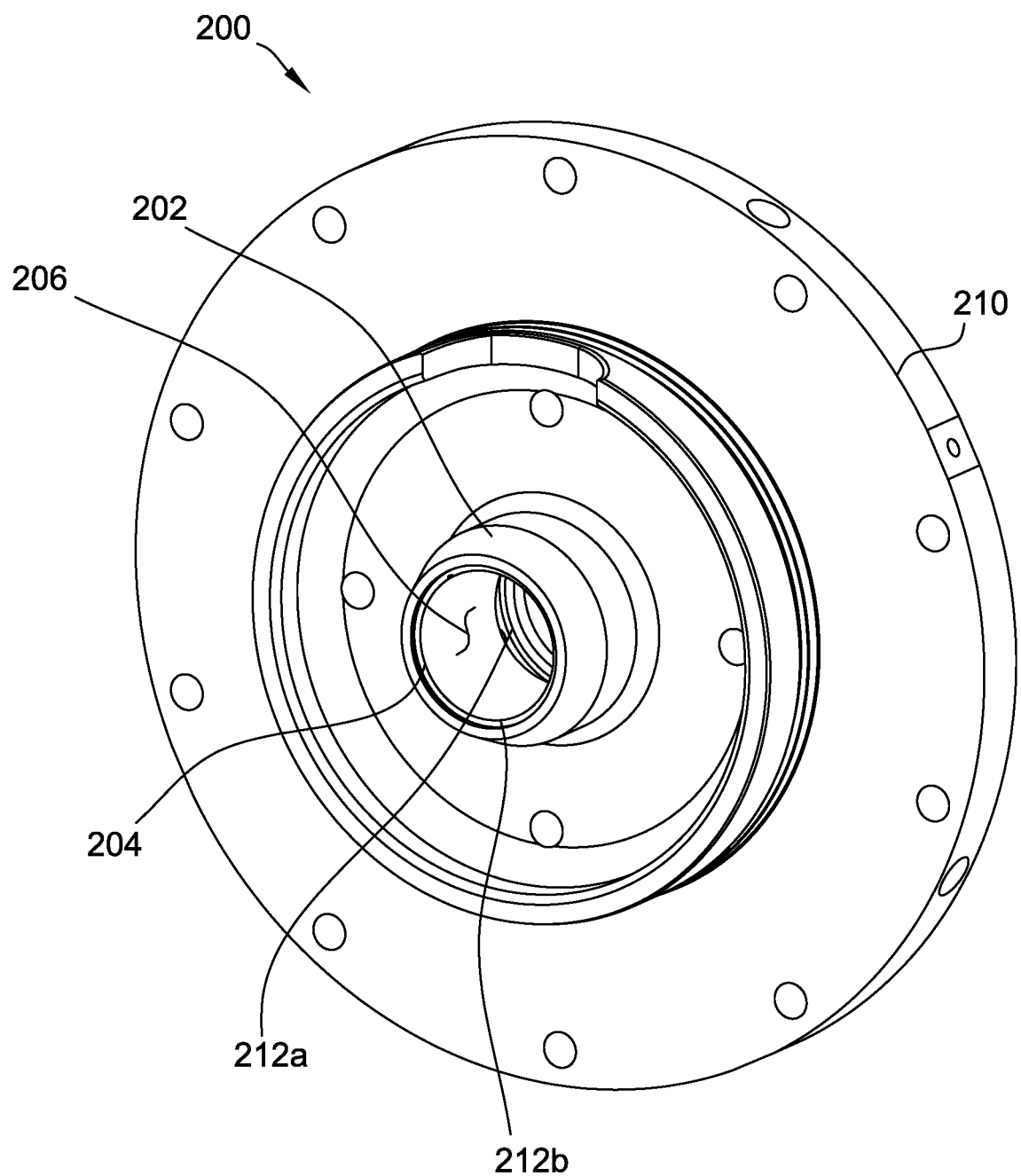
FIG. 13 is a perspective view of the bearing housing shown in FIG. 7.

Referring to FIG. 11, FIG. 12, and FIG. 13, the mounting structure 210 of each bearing housing 200/200a connects the respective bearing housing 200/200a to the compressor housing 102 (shown in FIGS. 1 and 2). In the illustrated embodiment, the mounting structure 210 generally projects in a radially outward direction to a dimension matched to the outer dimension of the compressor housing 102. The bearing housing 200 may include any form of mounting structure 210 including, without limitation, an annular flange. Further, in the illustrated embodiment, each bearing housing 200/200a, together with a portion of the compressor housing 102, forms a sealed compartment (e.g., a diffuser) enclosing each compression stage to enhance the effectiveness of the refrigerant pressure rise resulting from the impeller-induced acceleration and expansion into the diffuser, as described above. The bearing housings 200/200a may further serve as a mounting structure for a variety of elements including, but not limited to, radial bearings, such as the foil bearing assembly 300 described above, a thrust bearing, and sensing devices 250 (shown in FIG. 4) used as feedback for passive or active control schemes such as proximity probes, pressure transducers, thermocouples, key phasers, and the like. The bearing housing 200 may further include external coolant conduits or channels 220 (shown in FIG. 17) to enable active cooling of the foil bearing assembly.

Figure 17:
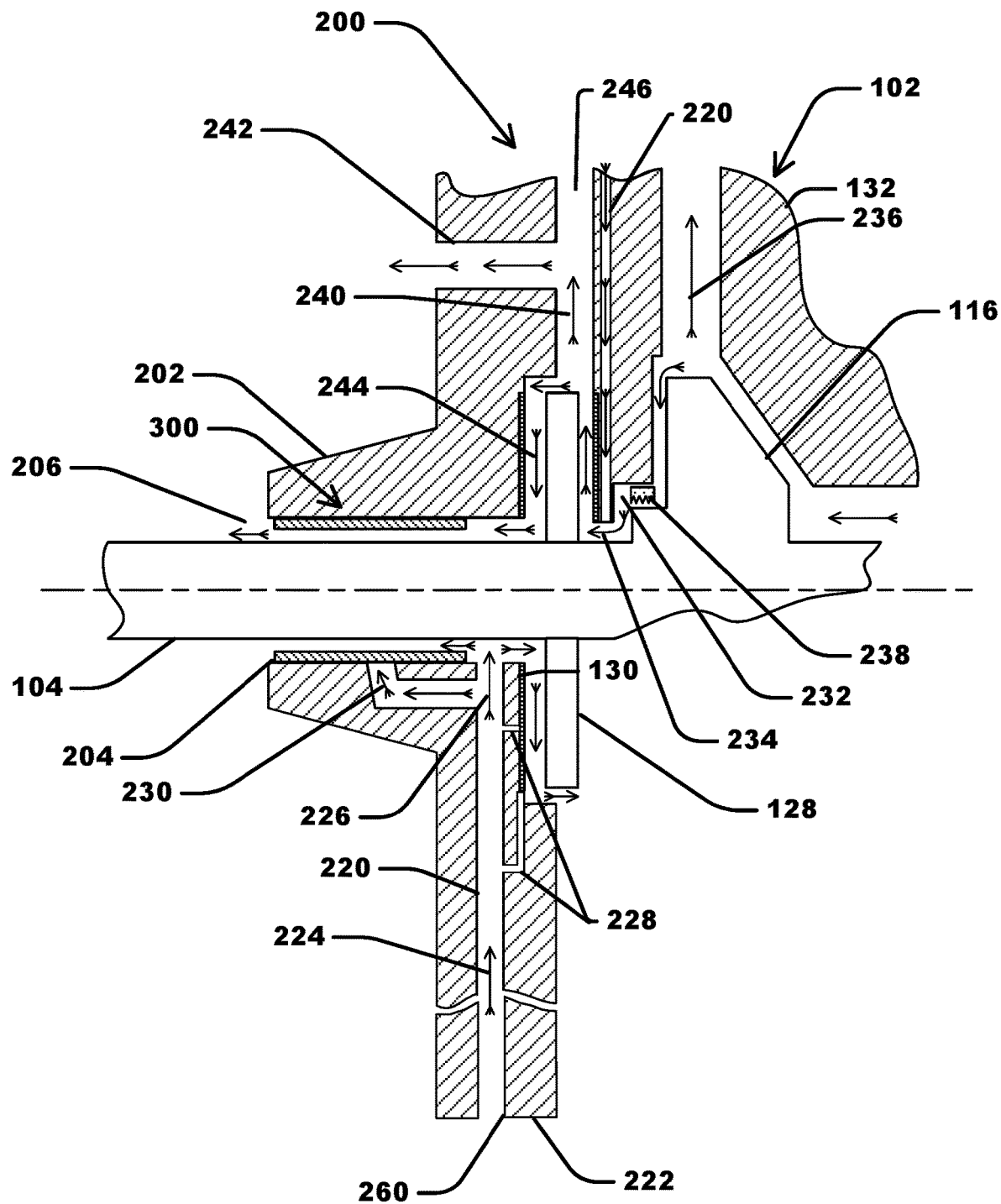
FIG. 17 is a cross-sectional view through a sleeve of the bearing housing shown in FIG. 4, illustrating cooling channels formed within the bearing housing to facilitate cooling of the bearing housing, bearing assemblies, and motor using coolant from internal or external sources.

Referring to FIG. 17, in some embodiments, each bearing housing 200/200a can include one or more radially-extending cooling channels 220 to deliver coolant from an external source and/or from the refrigerant system flow to the bearing housing 200/200a and foil bearing assembly 300. In the illustrated embodiment, each channel 220 extends radially outward from the cylindrical bore 206 to an opening 260 formed at a radial outer edge 222 of the bearing housing 200/200a (see also FIG. 7). The one or more radial channels 220 deliver a coolant flow 224 radially inward toward the cylindrical bore 206. A first portion 226 of the coolant flow 224 can be delivered directly into the cylindrical bore 206, providing cooling to the driveshaft 104. The first portion 226 of the coolant flow 224 can also be directed through one or more cooling passages 228 formed in the bearing housing 200/200a to and around a thrust bearing (e.g., a thrust runner 128 connected to the driveshaft 104 and/or thrust bearing plates 130 connected to the bearing housing 200). A second portion 230 of the coolant flow 224 can be delivered between the radial inner surface 204 of the cylindrical bore 206 and the foil bearing assembly 300 to provide cooling to the foil bearing assembly 300.

Additionally or alternatively, one or more of the radially-extending cooling channels 220 may be defined in a portion of the compressor housing 102 other than the bearing housing 200/200a. For example, the embodiment illustrated in FIG. 17 includes a radially-extending cooling channel 220 defined in an end cap 132 of the compressor housing 102 connected to the bearing housing 200.

Each bearing housing 200/200a may further be provided with at least one additional channel 232 to direct an internal coolant flow 234 diverted from the coolant flow 236 exiting the compressor housing 102 to facilitate cooling of the thrust bearing, foil bearing assembly 300, driveshaft 104, and/or motor 108 (not shown in FIG. 17). The diverted internal coolant flow 234 is directed past a labyrinth shaft seal 238 positioned in the channel 232 near the impeller 116, and is subsequently directed radially outward over and around the thrust bearing. A first portion 240 of the internal coolant flow 234 (e.g., a motor coolant flow) can be fed to the motor 108 through a cooling passage 242 formed in the bearing housing 200 at a position radially outward from the cylindrical bore 206 and extending axially through the bearing housing 200. A second portion 244 of the diverted internal coolant flow 234 can be directed radially inward past the thrust runner 128 and toward the driveshaft 104, and subsequently directed axially through the cylindrical bore 206 between the driveshaft 104 and the foil bearing assembly 300. In some embodiments, the first portion 240 of the internal coolant flow 234 may be directed through a conduit 246 formed between adjacent surfaces of the bearing housing 200 and the compressor housing 102 (e.g., between the end cap 132 and the bearing housing 200).

Figure 14:
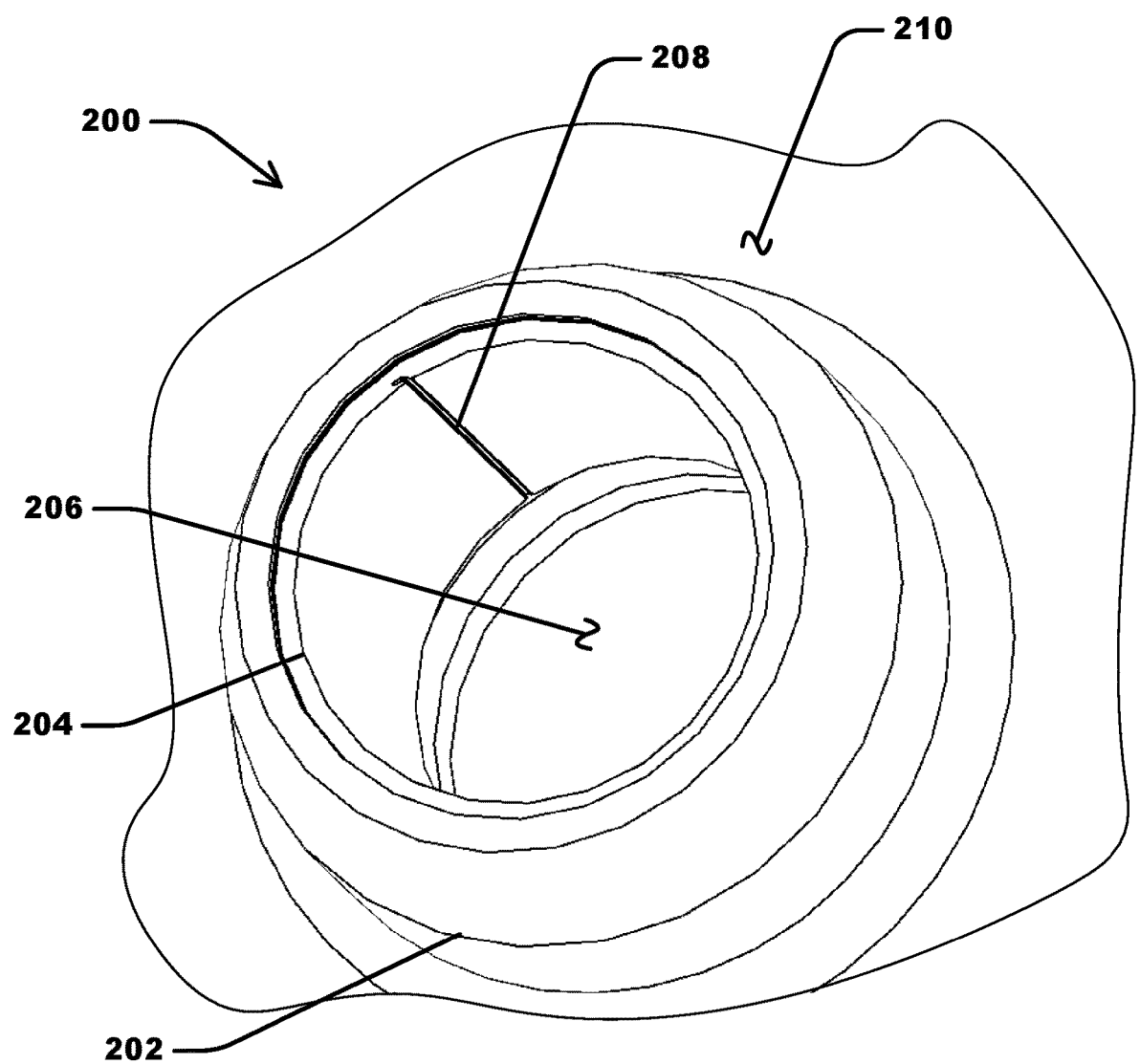
FIG. 14 is a close-up view of the sleeve of the bearing housing shown in FIG. 10, illustrating the bearing assembly locking feature.

Referring to FIG. 13 and FIG. 14, the bearing housing sleeve 202 has a radial inner surface 204 that defines the cylindrical bore 206. The cross-sectional profile of the cylindrical bore may be essentially circular, or may be any other rounded or polygonal shape without limitation, such as elliptical, square, octagonal, and the like. The radial inner surface 204 is sized and dimensioned to receive the foil bearing assembly 300 such that the outer layer 302 of the foil bearing assembly 300 contacts the radial inner surface 204.

Referring to FIG. 13, the radial inner surface 204 is provided with at least one or more additional features to enable retaining the foil bearing assembly in a fixed axial and rotational position within the sleeve 202. In some embodiments, for example, a first circumferential groove 212a and a second circumferential groove 212b are formed within the radial inner surface 204. The first and second circumferential grooves 212a/212b are sized and dimensioned to receive foil retaining clips 314a and 314b, respectively, as illustrated in FIG. 5. In other embodiments, the first circumferential groove 212a may be replaced by a circumferential foil retaining lip 214 (see FIG. 6).

Referring to FIG. 14, the radial inner surface 204 of the bearing housing 200 is further provided with a bearing assembly locking feature 208. The bearing assembly locking feature 208 interlocks with one or more bearing retention features provided on the foil bearing assembly 300 as described below. The bearing assembly locking feature 208 may be any suitable form of mechanically interlocking feature without limitation. Non-limiting examples of suitable mechanically interlocking features include raised features such as an axial ridge, key, or tab, and axial depressions formed within the radial inner surface 204 such as an axially-extending slot, an axially-extending keyhole or keeper as illustrated in FIG. 14.

Figure 15:
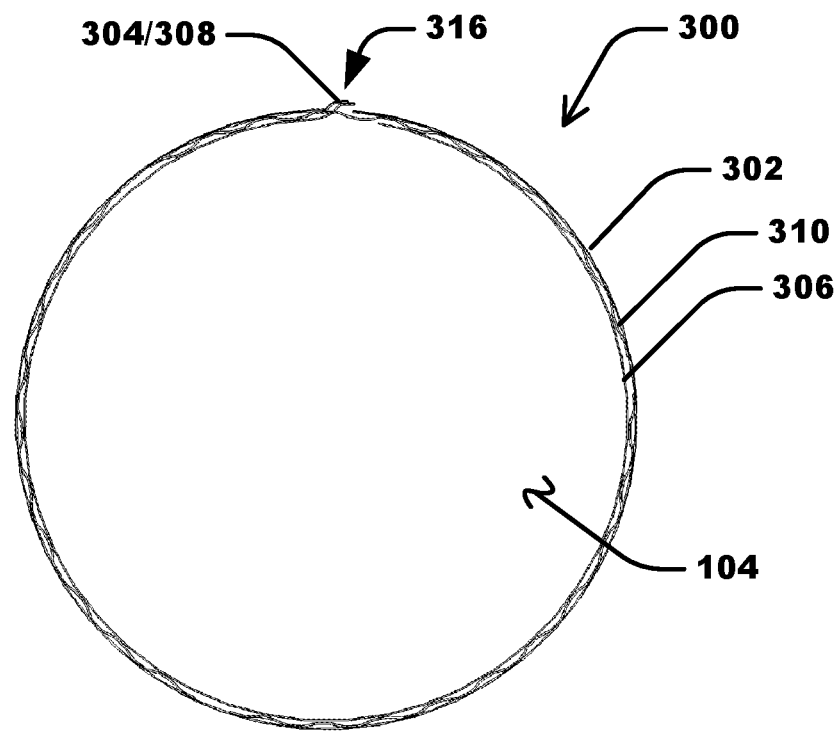
FIG. 15 is a front view of the foil bearing assembly shown in FIG. 8 with the foil keeper and foil retaining clip removed.
Figure 16:
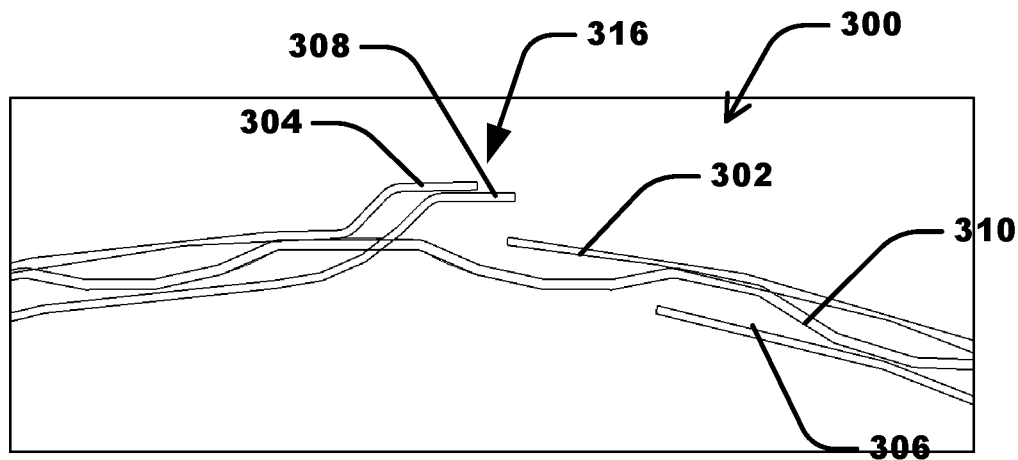
FIG. 16 is a close-up view of the foil bearing assembly shown in FIG. 15, showing first and second bearing retention features.

Referring to FIGS. 15 and 16, the foil bearing assembly 300 further includes at least one bearing retention feature 304/308 to cooperatively engage the bearing assembly locking feature 208 to maintain the foil bearing assembly within the bearing housing at a fixed rotational position within the cylindrical bore 206 of the sleeve 202. That is, the bearing retention feature 304/308 and the bearing assembly locking feature 208 are sized and shaped complementary to one another such that, when the bearing retention feature 304/308 is engaged with the bearing assembly locking feature 208, the bearing assembly locking feature 208 inhibits or limits at least rotational movement of the bearing retention feature 304/308. The at least one bearing retention feature 304/308 may include any suitable form of mechanically interlocking feature without limitation. In some embodiments, the at least one bearing retention feature 304/308 is selected based on the choice of bearing assembly locking feature 208 provided within the cylindrical bore 206. Non-limiting examples of suitable mechanically interlocking features include raised features such as an axial ridge, key, or tab, as well as axial depressions formed within at least the outer foil layer 302 of the foil bearing assembly 300 such as an axial slot, an axial keyhole or keeper.

In some embodiments, the foil bearing assembly 300 includes a first bearing retention feature 304 formed along an edge of the outer layer 302 and a second bearing retention feature 308 formed along an edge of the inner layer 306. In such embodiments, the first and second bearing retention features 304/308 together form an axial tab 316 sized and dimensioned to interlock with the bearing assembly locking feature 208 provided in the form of an axial slot 208, as illustrated in FIG. 14.

The foil bearing assembly 300 may be provided in any suitable form without limitation. For example, the foil bearing assembly 300 may be provided with two layers, three layers, four layers, or additional layers without limitation. The inner layer 306 forms a cylindrical inner surface that closely fits the surface of the driveshaft 104, as illustrated in FIG. 15. The bump foil 310 of the foil bearing assembly 300 may be formed from a radially elastic structure to provide a resilient surface for the spinning driveshaft 104 during operation of the compressor 100. The bump foil 310 may be formed from any suitable radially elastic structure without limitation including, but not limited to, an array of deformable bumps or other features designed to deform and rebound under intermittent compressive radial loads, and any other elastically resilient material capable of compressing and rebounding under intermittent compressive radial loads. The bump foil 310 may be connected to at least one adjacent layer including, but not limited to at least one of the outer layer 302 and the inner layer 306. In some embodiments, the bump foil 310 may be connected to both the outer layer 302 and the inner layer 306. In other embodiments, the bump foil 310 may be free-floating and not connected to any layer of the foil bearing assembly 300.

In some embodiments, the outer layer 302 provides a smooth inner surface for support of the adjacent bump foil layer 310 for efficient transmission of transient deflections caused by radial forces exerted by the driveshaft 104 to the inner layer 306 during operation of the compressor 100. The outer layer 302 provides this smooth inner surface independently of the surface smoothness of the underlying radial inner surface 204 of the cylindrical bore 206 of the bearing housing 200. Thus, in some embodiments, use of the outer layer 302 facilitates increasing the surface specification of the radial inner surface 204 of the cylindrical bore 206 or, stated another way, reducing a surface smoothness requirement of the radial inner surface 204. In some embodiments, the foil bearing assembly 300 is suitable for use with a bearing housing 200 in an "as-cast" condition without need for further machining, grinding, or any other means to smooth the radial inner surface 204 of the cylindrical bore 206 of the bearing housing 200. Accordingly, in some embodiments, the radial inner surface 204 of the cylindrical bore 206 is an as-cast surface. That is, the radial inner surface 204 of the cylindrical bore 206 is a surface of a cast bearing housing 200 that has not undergone post-cast machining, grinding, or similar means to smooth the radial inner surface 204.

Additionally, in some embodiments, the outer layer 302 improves thermal management of the foil bearing assembly 300, thereby increasing reliability and durability of foil bearing components and the compressor 100. More specifically, by using the compliant foil layer 302, working fluid can circulate on both sides of the foil bearing assembly 300, thereby improving cooling of the foil layers 302 and 306. Also, by retaining the foil layers 302 and 306 directly within the bearing housing sleeve 202, a secondary bearing assembly sleeve is not required. This eliminates the potential interface between the secondary bearing assembly sleeve and the bearing housing sleeve 202, which improves conduction of heat away from the foil bearing assembly 300. This allows for a smaller bearing housing sleeve 202, resulting in less thermal mass to retain heat generated within the foil bearing assembly.

Further, in some embodiments, use of the outer layer 302 facilitates reducing space requirements of the foil bearing assembly 300 and provides a more compact design. More specifically, by using the compliant foil layer 302, a secondary bearing assembly sleeve is not required. The compliant foil layer 302 provides the surface finish requirements for proper functioning of the bump foil 310 that the secondary bearing housing would normally provide. This allows the outer diameter of the bearing housing sleeve 202 to decrease, resulting in a reduced space requirement and providing a more compact design. For example, by reducing the outer diameter of the bearing housing sleeve 202, the bearing housing sleeve 202 may extend axially into or be positioned within a portion of the motor 108 (e.g., a cylindrical motor cavity enclosed by the motor windings), as illustrated in FIG. 2, resulting in an overall decrease in the axial length of the compressor 100.

The bearing housing may be used as part of a method of assembling a compressor. The assembly method includes mounting the bearing housing to the compressor housing using the mounting structure of the bearing housing as described above. The assembly method also includes inserting a foil bearing assembly into the cylindrical bore and connecting the foil bearing assembly to the bearing housing by cooperatively engaging a bearing retention feature of at least one layer of the foil bearing assembly with the bearing assembly locking feature to maintain the foil bearing assembly within the bearing housing at a fixed rotational position as described above. The method further includes inserting at least one foil retaining clip into a circumferential groove formed within the inner surface of the cylindrical bore to retain the foil bearing assembly in a fixed axial position with respect to the cylindrical bore.

Embodiments of the systems and methods described achieve superior results as compared to prior systems and methods. Bearing systems including a gas foil bearing assembly to support a driveshaft of a compressor enable low friction support of the driveshaft without the use of oil-based lubricants. The oil-free foil bearing assembly is compatible with a wide variety of working fluids including, but not limited to, CFC, HCFC, CFC-free refrigerants in cooling compressors, and fuel-air mixtures in turbocharger compressors. The bearing systems are suitable for use with any type of cooling compressor including, but not limited to, rotary-vane compressors, rotary-scroll compressors, rotary-screw compressors, and centrifugal compressors. Without being limited to any particular theory, gas foil-type bearings are known to be well-suited for the support of driveshafts characterized by high rotational speeds. In various aspects, the disclosed bearing systems are compatible with centrifugal compressors, which typically operate at high driveshaft rotation rates. The bearing systems may be incorporated into the design of any type of centrifugal compressors. Non-limiting examples of centrifugal compressors suitable for use with the disclosed bearing system include single-stage, two-stage, and multi-stage centrifugal compressors.

Unlike known bearing systems that include at least one foil bearing assembly, the single bearing housing of the bearing systems described enable a reduction in tolerance stack-up, resulting in tighter tolerances and enhanced manufacturing accuracy, both of which are important factors in the successful implementation of centrifugal compressors as discussed above. In addition, the integration of multiple joined parts into a single bearing housing of the disclosed bearing system provides for enhanced heat transfer from the foil bearing assembly positioned within the sleeve of the bearing housing, reducing or eliminating the adverse operating conditions associated with thermal run out and mechanical failure of the foil bearing assembly. Further, the bearing housing may be provided with additional coolant conduits as described above to further enhance the heat transfer capacity of the bearing housing. The tighter tolerances, enhanced manufacturing accuracy, and enhanced thermal management of the foil bearing assembly enabled by features of the disclosed bearing system combine to enhance the working life and durability of the foil bearing assembly, thereby enhancing the suitability of foil bearing assemblies for use in the challenging operating environment of refrigerant compressors of HVAC systems.

Example embodiments of bearing systems and methods, such as refrigerant compressors that incorporate the disclosed bearing system and methods of assembling compressors that include the disclosed bearing assembly, are described above in detail. The systems and methods are not limited to the specific embodiments described herein, but rather, components of the system and methods may be used independently and separately from other components described herein. For example, the bearing housing and bearing assemblies described herein may be used in compressors other than refrigerant compressors, such as turbocharger compressors and the like.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A bearing system comprising:
    a bearing housing including:
        a sleeve having a radial inner surface defining a cylindrical bore, wherein the sleeve includes a bearing assembly locking feature located along the radial inner surface; and
        a mounting structure for connecting the bearing system to a compressor housing, the mounting structure located radially outward from the sleeve; and
    a foil bearing assembly positioned within the cylindrical bore and including an outer foil, an inner foil, and a bump foil positioned between the outer foil and the inner foil, wherein at least one of the outer foil and the inner foil includes a bearing retention feature having a radial inner side and a radial outer side, wherein the at least one bearing retention feature is cooperatively engaged with the bearing assembly locking feature to maintain the foil bearing assembly within the bearing housing at a fixed rotational position, and wherein the bearing assembly locking feature bounds the at least one bearing retention feature on its radial inner and outer sides to inhibit radially inward and outward movement of the at least one bearing retention feature.

2. The bearing system of claim 1, wherein the outer foil includes a first bearing retention feature, and the inner foil includes a second bearing retention feature, wherein each of the first and second bearing retention features cooperatively engages the bearing assembly locking feature to maintain the foil bearing assembly within the bearing housing at a fixed rotational position.

3. The bearing system of claim 2, wherein the first bearing retention feature includes a first tab positioned radially outward from the outer foil, and the second bearing retention feature includes a second tab positioned radially outward from the inner foil, and wherein the bearing assembly locking feature includes an axially-extending slot defined within the sleeve along the radial inner surface, wherein each of the first and second tabs is received within the slot.

4. The bearing system of claim 1, wherein the mounting structure includes an annular flange extending radially outward from the sleeve.

5. The bearing system of claim 1, wherein the radial inner surface is an as-cast surface.

6. The bearing system of claim 1, wherein the bearing housing further includes a foil retaining lip formed integrally with the bearing housing and projecting radially inward from the radial inner surface to inhibit axial movement of the foil bearing assembly.

7. The bearing system of claim 6, further comprising a removable foil retaining clip connected to the bearing housing and positioned adjacent an end of the foil bearing assembly opposite the foil retaining lip.

8. The bearing system of claim 6, wherein the foil retaining lip is positioned at an impeller end of the cylindrical bore.

9. The bearing system of claim 1, wherein the bearing housing defines at least one radially-extending cooling channel extending from a radial outer edge of the bearing housing to the cylindrical bore to deliver a coolant flow thereto.

10. The bearing system of claim 9, wherein the at least one radially-extending cooling channel delivers at least a portion of the coolant flow between the radial inner surface and the outer foil.

11. The bearing system of claim 9, further comprising at least one cooling passage, wherein at least a portion of the coolant flow is directed through the at least one cooling passage to a thrust bearing.

12. The bearing system of claim 1, wherein the bearing housing defines an axially-extending cooling passage at a position radially outward from the cylindrical bore for delivery of a motor coolant flow therethrough.

13. A compressor comprising:
    a compressor housing;
    a driveshaft rotatably supported within the compressor housing;
    an impeller connected to the driveshaft and operable to impart kinetic energy to incoming refrigerant gas upon rotation of the driveshaft;
    a bearing housing mounted to the compressor housing and including a sleeve having a radial inner surface defining a cylindrical bore, wherein the sleeve includes a bearing assembly locking feature located along the radial inner surface; and
    a foil bearing assembly rotatably supporting the driveshaft and positioned within the cylindrical bore, the foil bearing assembly including an outer foil, an inner foil, and a bump foil positioned between the outer foil and the inner foil, wherein at least one of the outer foil and the inner foil includes a bearing retention feature having a radial inner side and a radial outer side, wherein the at least one bearing retention feature is cooperatively engaged with the bearing assembly locking feature to maintain the foil bearing assembly within the bearing housing at a fixed rotational position, and wherein the bearing assembly locking feature bounds the at least one bearing retention feature on its radial inner and outer sides to inhibit radially inward and outward movement of the at least one bearing retention feature.

14. The compressor of claim 13, wherein the bearing housing includes a mounting structure located radially outward from the sleeve, wherein the bearing housing is mounted to the compressor housing by the mounting structure.

15. The compressor of claim 13, wherein the outer foil includes a first bearing retention feature, and the inner foil includes a second bearing retention feature, wherein each of the first and second bearing retention features cooperatively engages the bearing assembly locking feature to maintain the foil bearing assembly within the bearing housing at a fixed rotational position.

16. The compressor of claim 13, wherein the compressor comprises a first compression stage, a second compression stage, and a refrigerant transfer conduit to transfer compressed refrigerant from the first compression stage to the second compression stage.

17. The compressor of claim 16, wherein the impeller is a first impeller of the first compression stage, and wherein the second compression stage comprises a second impeller connected to the driveshaft at an opposite end of the driveshaft from the first impeller.

18. The compressor of claim 13, further comprising a motor, wherein the sleeve extends axially into a portion of the motor.

19. A method of assembling a compressor including a compressor housing, the method comprising:
- mounting a bearing housing to the compressor housing, the bearing housing including a sleeve having a radial inner surface defining a cylindrical bore, the sleeve including a bearing assembly locking feature located along the radial inner surface;
- inserting a foil bearing assembly within the cylindrical bore, the foil bearing assembly including an outer foil, an inner foil, and a bump foil positioned between the outer foil and the inner foil; and
- connecting at least one of the outer foil and the inner foil to the bearing housing by cooperatively engaging a bearing retention feature of the at least one of the outer foil and the inner foil with the bearing assembly locking feature to maintain the foil bearing assembly within the bearing housing at a fixed rotational position, wherein the bearing retention feature includes a radial inner side and a radial outer side, and wherein the bearing assembly locking feature bounds the bearing retention feature on its radial inner and outer sides to inhibit radially inward and outward movement of the bearing retention feature.

20. The method of claim 19 further comprising inserting a driveshaft within the foil bearing assembly such that the driveshaft is rotatably supported within the compressor housing by the foil bearing assembly.

* * * * *